US011568558B1

(12) United States Patent
Radwell et al.

(10) Patent No.: US 11,568,558 B1
(45) Date of Patent: Jan. 31, 2023

(54) PRODUCT PHOTO BOOTH

(71) Applicant: Radwell International Inc., Willingboro, NJ (US)

(72) Inventors: Todd Radwell, Columbus, NJ (US); Jason Larsen, Eastampton, NJ (US); Joseph Waldman, Cherry Hill, NJ (US)

(73) Assignee: Radwell International, Inc., Willingboro, NJ (US)

( * ) Notice: Subject to any disclaimer, the term of this patent is extended or adjusted under 35 U.S.C. 154(b) by 0 days.

(21) Appl. No.: 17/411,954

(22) Filed: Aug. 25, 2021

(51) Int. Cl.
  *G06T 7/00* (2017.01)
  *G06T 7/62* (2017.01)
  *H04N 1/00* (2006.01)
  *G01G 19/52* (2006.01)

(52) U.S. Cl.
  CPC .............. *G06T 7/62* (2017.01); *G01G 19/52* (2013.01); *H04N 1/00289* (2013.01); *G06T 2207/10028* (2013.01)

(58) Field of Classification Search
  CPC . G06T 2207/10016; G06T 7/62; G06T 7/246; G06T 7/97; G06T 2207/10012; G06T 15/60; G06T 2207/10024; G06T 2207/10028; G06T 2215/12; G06T 3/4038; G06T 5/006; G06T 7/33; G01B 11/00; G01B 11/02; G01B 11/2513; G01B 11/022; G01B 11/2433; G01B 3/1084; G01B 11/024; G01B 11/026; G01B 11/24; G01B 21/042; G06K 9/6215; G06K 9/6201; G06K 7/10297
  See application file for complete search history.

(56) References Cited

U.S. PATENT DOCUMENTS

| | | |
|---|---|---|
| 5,699,161 A | 12/1997 | Woodworth |
| 6,788,886 B2 | 9/2004 | Saigo |
| 7,055,976 B2 | 6/2006 | Branford |
| 7,396,148 B1 | 7/2008 | Tsai |
| 7,680,401 B1 | 3/2010 | Adelstein |
| RE42,430 E | 6/2011 | Carlsruh et al. |
| 8,136,727 B2 | 3/2012 | Rollyson et al. |
| 8,260,127 B2 | 9/2012 | Reno |
| 9,121,751 B2 | 9/2015 | Michael |

(Continued)

FOREIGN PATENT DOCUMENTS

| | | | | |
|---|---|---|---|---|
| WO | WO-2020240210 A1 | * | 12/2020 | ............... G06T 7/11 |
| WO | WO20200240210 A1 | | 12/2020 | |

OTHER PUBLICATIONS

International Search Report and Written Opinion in corresponding application PCT/US21/47546 filed Nov. 30, 2021.

(Continued)

*Primary Examiner* — Quan M Hua
(74) *Attorney, Agent, or Firm* — White and Williams LLP

(57) ABSTRACT

Certain embodiments of the disclosure may include devices, systems, and methods for photographing and dimensioning objects in a photo booth. The devices may include multiple sets of components, and the multiple sets of components may be mounted in different locations of the booth as desired and as needed, for example, depending on the object to be photographed and dimensioned. The photo booth components and functions can be operated and managed via central processing and via user interface and can be in communication with remote computers.

24 Claims, 6 Drawing Sheets

(56) References Cited

U.S. PATENT DOCUMENTS

| | | | |
|---|---|---|---|
| 9,305,201 B2 | 4/2016 | Barten | |
| 9,442,347 B1 | 9/2016 | Nyssen et al. | |
| 9,523,904 B2 | 12/2016 | Lin | |
| 9,581,423 B2 | 2/2017 | Alxneit | |
| 10,674,097 B2 | 6/2020 | Mun | |
| 2012/0163782 A1* | 6/2012 | McColl | G03B 15/06 396/3 |
| 2012/0209741 A1 | 8/2012 | Bonner et al. | |
| 2015/0085067 A1* | 3/2015 | Mueller | F16M 13/027 348/37 |
| 2015/0138538 A1* | 5/2015 | Sakurai | C12Q 1/6872 356/72 |
| 2016/0245640 A1 | 8/2016 | Joachim et al. | |
| 2017/0264880 A1 | 9/2017 | Zolotov | |
| 2017/0280125 A1* | 9/2017 | Brown | B65G 1/00 |
| 2019/0109983 A1 | 4/2019 | Wheeler et al. | |
| 2021/0006681 A1 | 1/2021 | Colagrande et al. | |
| 2021/0030169 A1 | 2/2021 | Zhai et al. | |

OTHER PUBLICATIONS https://www.amazon.com/Neewer-Adjustable-Brightness-Professional-Photography/dp/B07LBKXNGL/ref=sr_1_2_sspa? [Amazon search retrieved on Aug. 23, 2021].

https://www.amazon.com/PULUZ-Portable-Photography-Shooting-Backdrops/dp/B072148WM9/ref=psdc_3444581_t2_B01N7P8CGK [Amazon search retrieved on Aug. 23, 2021].

https://www.amazon.com/Neewer-Shooting-Diffusion-Backdrops-Photography/dp/B00GKFUFFE/ref=asc_df_B00GKFUFFE/ [Amazon search retrieved Aug. 23, 2021].

https://www.mt.com/us/en/home/products/Industrial_Weighing_Solutions/bench-scales/invision.html [Mettler Toledo website retrieved Aug. 23, 2021].

* cited by examiner

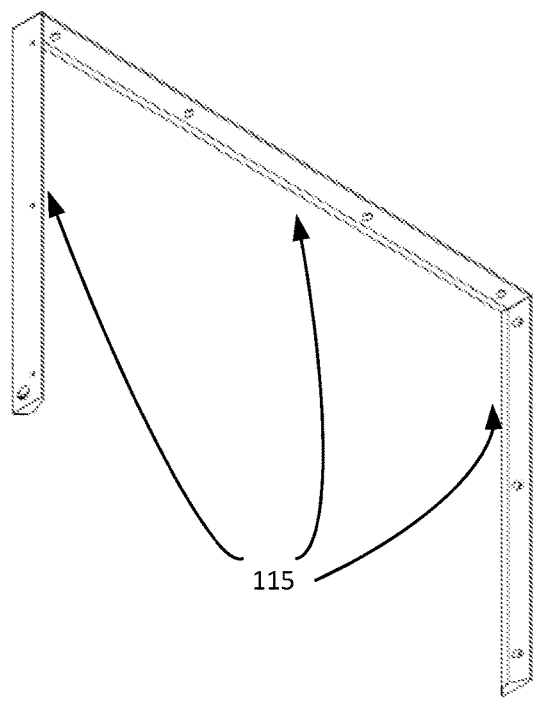
Figure 1F
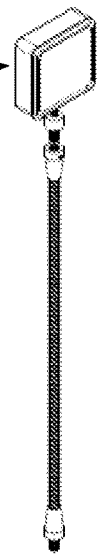
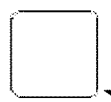
Figure 1G    Figure 1H

PRODUCT PHOTO BOOTH

TECHNICAL FIELD

The present disclosure relates to photo booth setups for product photography. In particular, the present embodiments relate to dimensioning, weighing, and photographing products for marketing, advertising, and inventory.

BACKGROUND

As the need has grown for more detailed information about products, innovation has been slow in keeping up. Retrofitting cameras, scales, and structure to imaging devices has lacked in functionality and aesthetics. Contemporary devices that attempt to photograph products—in addition to weighing and dimensioning the products—have not been able to keep up with consumer demand for more functionality. These devices are also often clumsy in appearance and not well-integrated.

There is nothing currently in the industry that combines dimensioning and weighing in a photo booth. And in photo booths, there are no available products that can measure multiple dimensions of an object that do not require human interaction for moving the object, or require placing the object next to another object of known measurements or next to a grid-type measurement guide. This absence of availability for desired functionality is even more pronounced when photographing and dimensioning objects of varying sizes and shapes.

SUMMARY

As more products become available in the online marketplace, consumers demand more information about the products. In addition to photographs, consumers also seek data about the products' dimensions, weight, and appearance. This information must be recorded and then stored for later retrieval. The accuracy of the dimensions, weight, and photographic images are crucial for selling and categorizing products, especially when via the internet. The product's color, shading, dimensions, weight, and shape are often necessary for a consumer to make a purchasing decision, and for inventory to be accurate and efficient.

In one embodiment, a device for photographing and dimensioning an object is provided. The device can include a base on which the object can be placed, and the base can include sensors for measuring the weight of the object. The weight can be communicated to a microprocessor and software for management of the measurement. The base can be connected to a backdrop for photographing the object, and the backdrop can be curved. The device can include one or more light sources to illuminate the object or parts of the object. The light sources can be coupled to the base and can be controlled by a microprocessor. The device can also include one or more cameras for recording and measuring the object, and the cameras can be in communication with the microprocessor. The device can include multiple sensors for measuring dimensions of the object, and the sensors can communicate their data to the microprocessors.

Each light source of the device can be individually configured by the microprocessor for a unique angle of illumination, and for a unique level of brightness. The weighing surface can be suspended above the weighing sensor(s) to aid in accurate measurements. The curved backdrop can be configured from a single sheet of white plastic material. At least one of the dimensioning sensors can include point cloud data that can be communicated to and evaluated by one or more microprocessors. Each sensor can be operable to measure multiple dimensions, and the measurements can be taken without moving the object. The device can also include a user interface run by the microprocessor and which can be operable to control all other components coupled to the microprocessor.

In another embodiment, there is provided a method for photographing and dimensioning an object. The method can include weighing the object via one or more weight/force detecting sensors. The method can include framing an object with a seamlessly curved background, and illuminating the object with at least one light source. The method can include measuring at least one dimension of the object via one or more sensors. The method can also include recording an image of the object via one or more cameras. And the method can include managing the functionalities and data of the photographic dimensioning via one or more microprocessors.

The method can include configuring each light source with an adjustable angle of illumination, which can be independent of the other light sources. Similarly, the brightness of each light source can be adjustable and independently configured. The measuring of a dimension can include an evaluation of point cloud data, and multiple dimensions can be measured without moving the object and without using a reference object or guide. The method can include managing and controlling the light sources and the images through a user interface. Weighing the object can be achieved by suspending a weighing surface above weight-detecting sensors. And the object can be framed using a single white sheet of plastic material.

In another embodiment, there is provided a system for photographing and dimensioning objects. The system can include at least one microprocessor coupled to at least one computer memory, on which memory can be stored computer-executable instructions. The instructions can be configured to display on one or more computer screens an object to be weighed, dimensioned, and/or photographed. The instructions can also be configured to control one or more light sources in illuminating the object. The instructions can manage and coordinate the weighing of the object via the base sensors of the booth. And the instructions can measure multiple dimensions of the object substantially simultaneously and can record images of the object.

The computer instructions can be configured to adjust the brightness and the angle of illumination for each light source, independent of the levels of those attributes for the other light sources. The instructions can be operable to evaluate point cloud data received from one or more of the sensors and translate the data into dimensional information. The instructions can be operable to measure multiple dimensions of the object without having to move the object or use a reference object alongside. The instructions can be operable to manage and control the components of the system via a user input interface. The instructions can be operable to record and recall data to and from cloud-based memory. The instructions can be configured to measure the weight of the object placed on a surface suspended above the weighing sensors. And the system can include a curved backdrop composed of a single sheet of primarily plastic material.

Other embodiments, devices, methods, systems, aspects, and features of the disclosure will become apparent to those skilled in the art from the following detailed description.

BRIEF DESCRIPTION OF THE DRAWINGS

The various embodiments of the present disclosure now will be discussed in detail with an emphasis on highlighting the advantageous features. These embodiments depict the novel and non-obvious devices, methods, and systems shown in the accompanying drawings, which are for illustrative purposes only. These drawings include the following figures, in which like numerals indicate like parts:

FIG. 1F is a schematic of an illustrative frame with lighting configuration, according to various aspects of the present disclosure;

FIG. 1G is a schematic of an illustrative flexible light assembly, according to various aspects of the present disclosure;

FIG. 1H is a schematic of an illustrative flexible light assembly, according to various aspects of the present disclosure;

DETAILED DESCRIPTION

Figure 1A:
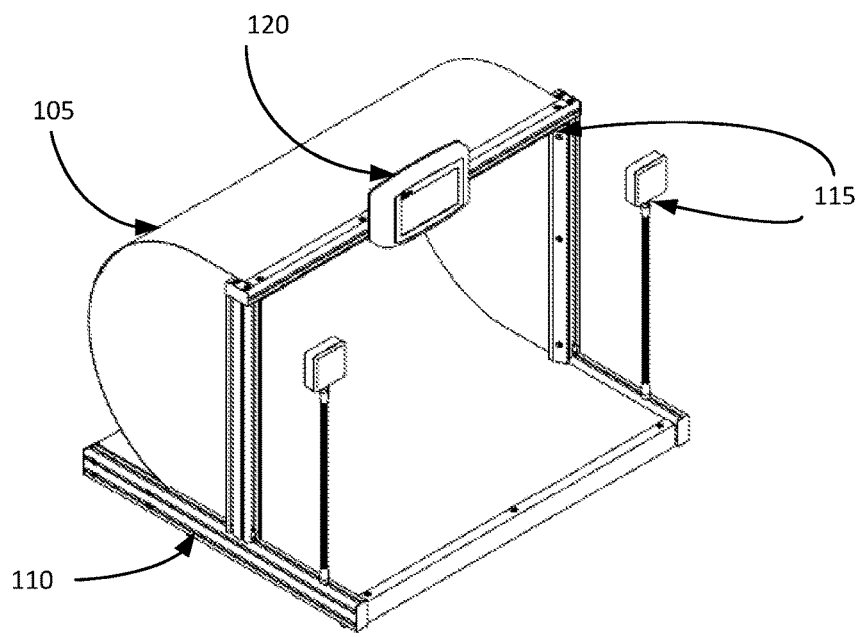
FIG. 1A is a front-view schematic illustrating a structure for photographic dimensioning, according to various aspects of the present disclosure.
Figure 1B:
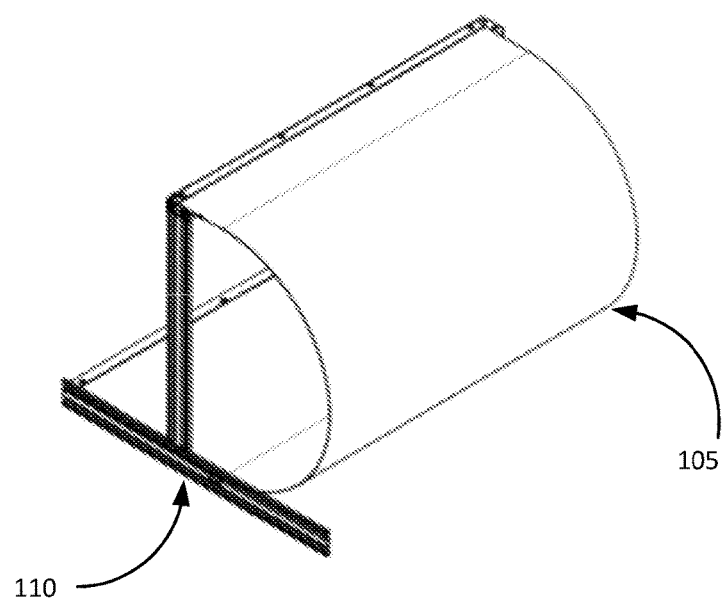
FIG. 1B is a rear-view schematic illustrating a structure for photographic dimensioning, according to various aspects of the present disclosure.
Figure 1C:
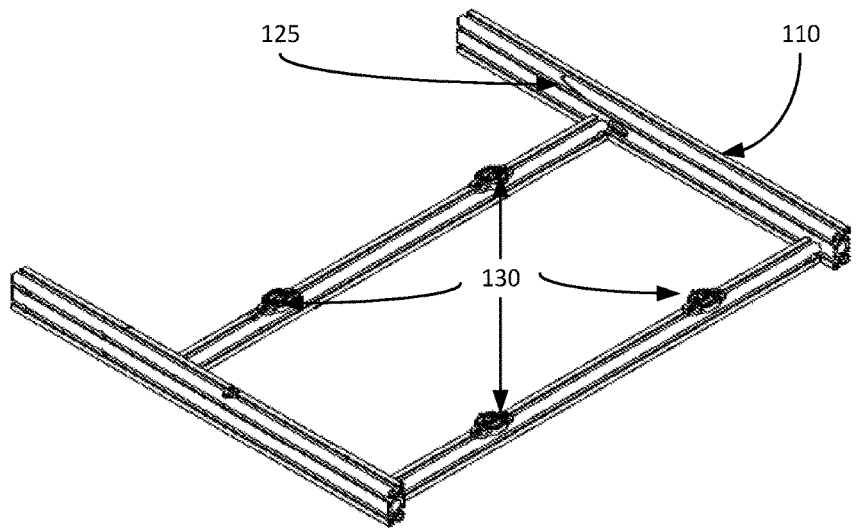
FIG. 1C is a schematic of an illustrative frame with weighing sensors, according to various aspects of the present disclosure.
Figure 1D:
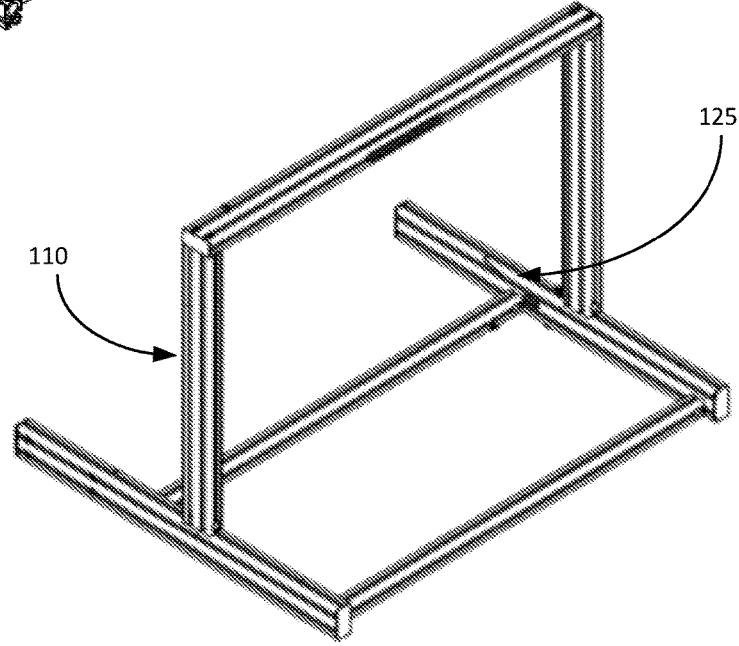
FIG. 1D is a schematic of an illustrative frame with frame slots, according to various aspects of the present disclosure.
Figure 1E:
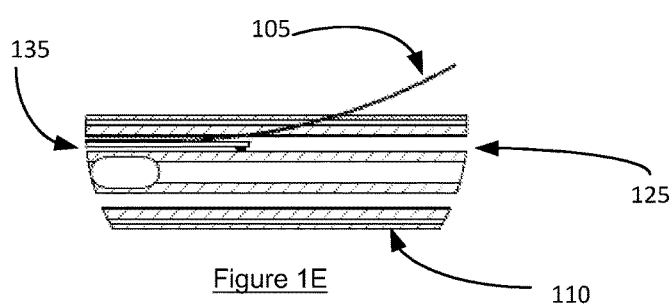
FIG. 1E is a cross-section schematic of an illustrative frame, according to various aspects of the present disclosure.

The following detailed description describes the present embodiments with reference to the drawings. In the illustrative drawings, reference numbers label elements of the present embodiments. These reference numbers are reproduced below in connection with the discussion of the corresponding drawing features. Like elements are referred to using like numbers. The disclosure may be embodied in many different forms and should not be construed as limited to the embodiments set forth herein.

Certain embodiments disclosed herein relate to dimensioning and photographing an object in a photo booth. Accordingly, a structure may be provided for management and operation of the physical and electronic features and functions of the photo booth. For example, the structure may include multiple sets of components, where different sets can be mounted or moved to multiple sides of the structure. With reference to FIGS. 1A through 1E, the present embodiments can include a frame 110 that may include a base, upright(s), and crossbar(s). The frame 110 can hold a sheet 105 securely and at a desired angle of curvature. The desired curve can be formed from an originally flat piece of material, for example plastic material such as polystyrene, by securing the ends of the sheet in slots 125 which can be configured into the frame 110. The slots 125 can be configured based on the material and based on the desired angle of curvature. The curvature can provide a smooth, seamless backdrop for objects placed on the flat surface of the sheet. Illumination from one or multiple light sources 115 can be directed at the object and can also indirectly illuminate the object via, for example, the curved backdrop. Light sources 115 can be coupled to rigidly flexible extensions and can also be strip lights or pinhole lights coupled to or embedded into the frame 110. The photo booth can include a camera and user interface and, in some embodiments, the camera and interface can be together in a single assembly 120. Assembly 120 can also include dimensioning sensors for measuring the physical dimensions of the objects.

Frame 110 can include one or more sensors 130 for weighing the object. The sensors 130 can be coupled to the frame in a permanent or removable manner and may be placed in a pattern desired for efficient weighing. In some aspects, sensors 130 can be placed outside the periphery of where an object would be placed. The sensors 130 can be located in positions below the level of the sheet 105 and the plate 135, such that contact between the plate 135 and the sheet 105 occurs when the object is placed upon the flat surface. While sheet 105 can be suspended above creating contact with sensors 130, plate 135 can be placed in continuous contact with sensors 130. Plate 135 can extend to and beyond contact with all the weighing sensors 130. Plate 135 can be composed of a metal, such as aluminum. In some embodiments, plate 135 can be configured for positional contact with sensors 130, such as divots on its bottom surface that line up with sensors 130. Depending on the desired arrangement, sheet 105 may contact sensors 130, directly or indirectly, only when the object is placed on the flat surface of sheet 105. In another aspect, sheet 105 may contact sensors 130 when no object is present, and the system may be calibrated to remove weight bias introduced by sheet 105. The weighing sensors 130 can include transducers and can communicate their data and detections to microprocessors, which can subsequently provide the data to user interface 120, among other destinations.

With reference now to FIGS. 1F through 1H, the photo booth can include light sources 115 in many and variable designs. A light source 115 can include variability in brightness and color, for example including the options of red, blue, green, and white. Additionally, some light sources 115 can have only a single brightness and color option, but can be different from other light sources 115 used in the same photo booth. The variability of brightness and color among and between light sources 115 can be managed and operated via a microprocessor of the photo booth. In some embodiments, the illumination variability can be based on input received at user interface 120. In some embodiments, strip lights 115 can be fitted or attached to frame 110. For example, frame 110 can include one or more channels for strip lights 115 and any electrical insulation that may be desired. Both frame 110 and strip lights 115 can be installed with a desired angle, such as toward the object or toward the backdrop.

Figure 1I:
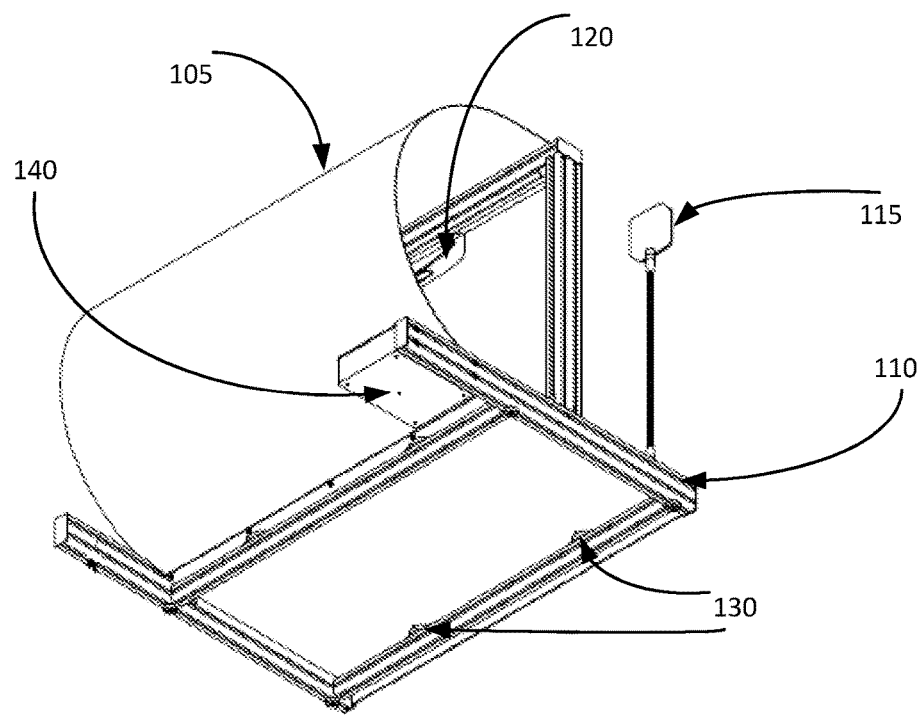
FIG. 1I is a rear-view schematic illustrating a structure for photographic dimensioning, according to various aspects of the present disclosure.
Figure 1J:
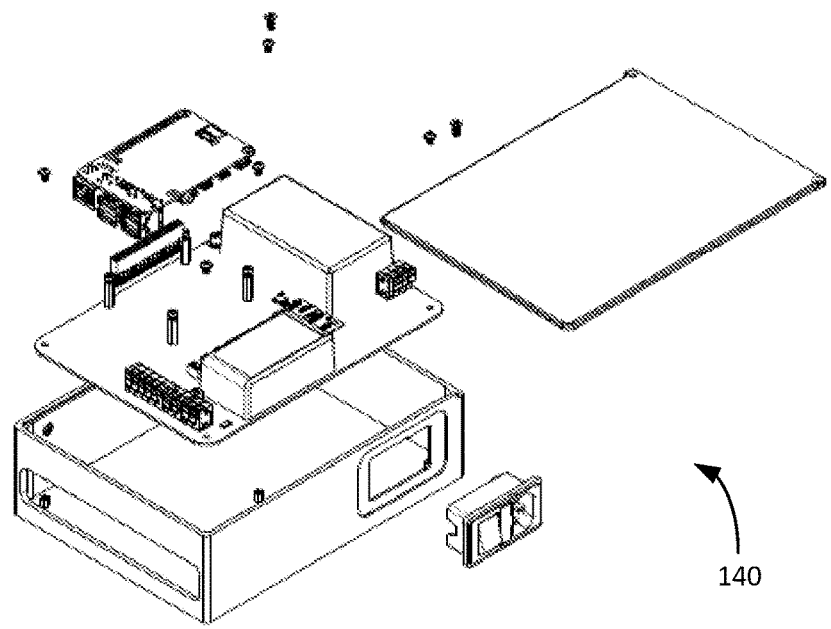
FIG. 1J is a schematic of an illustrative assembly for processing and power components, according to various aspects of the present disclosure.

With reference now to FIG. 1I and FIG. 1J, the photo booth can include at least one microprocessor for operating the components, managing the logic, and calculating measurements, among other processor tasks. In some embodiments, the microprocessors can be coupled to frame 110 for centralized and/or efficient attachment to electronic and electrical components. The one or more network adapters, that are used to communicate among components and between the booth and remote storage, can be housed along with the microprocessors in housing 140, for example. In other embodiments, these components can be housed separately. Housing 140 can also include wiring and power sources. Light sources 115, assembly 120, and weighing sensors 130 may be powered and operated by their communicative coupling to housing 140. In some embodiments, the communicative coupling can be via a wireless networking technology such as BLUETOOTH®. Housing 140 can include one or more heat sinks in order to dissipate the heat generated from the various components contained.

Figure 2:
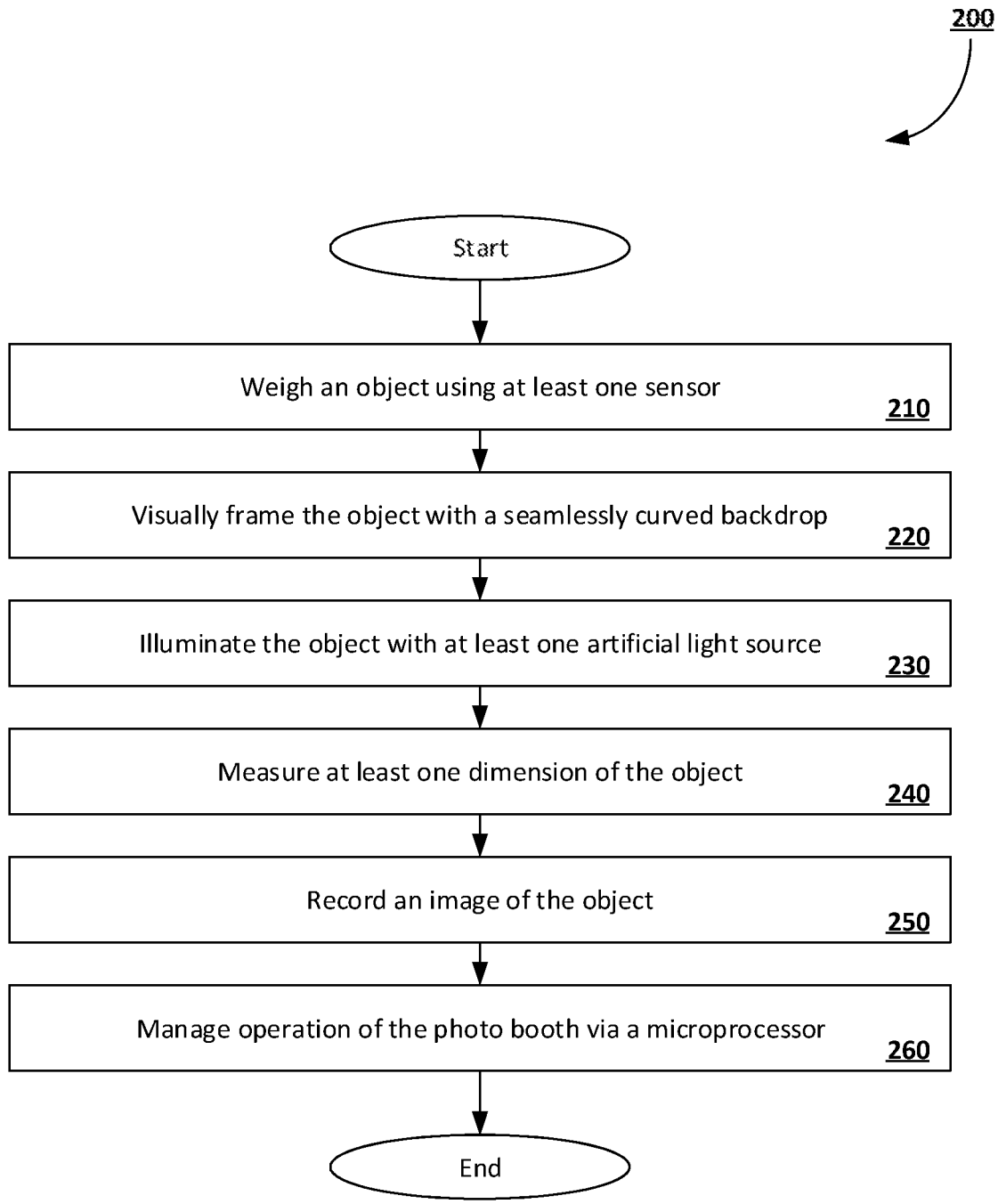
FIG. 2 is a flowchart illustrating a process for photographic dimensioning according to various aspects of the present disclosure.
Figure 3:
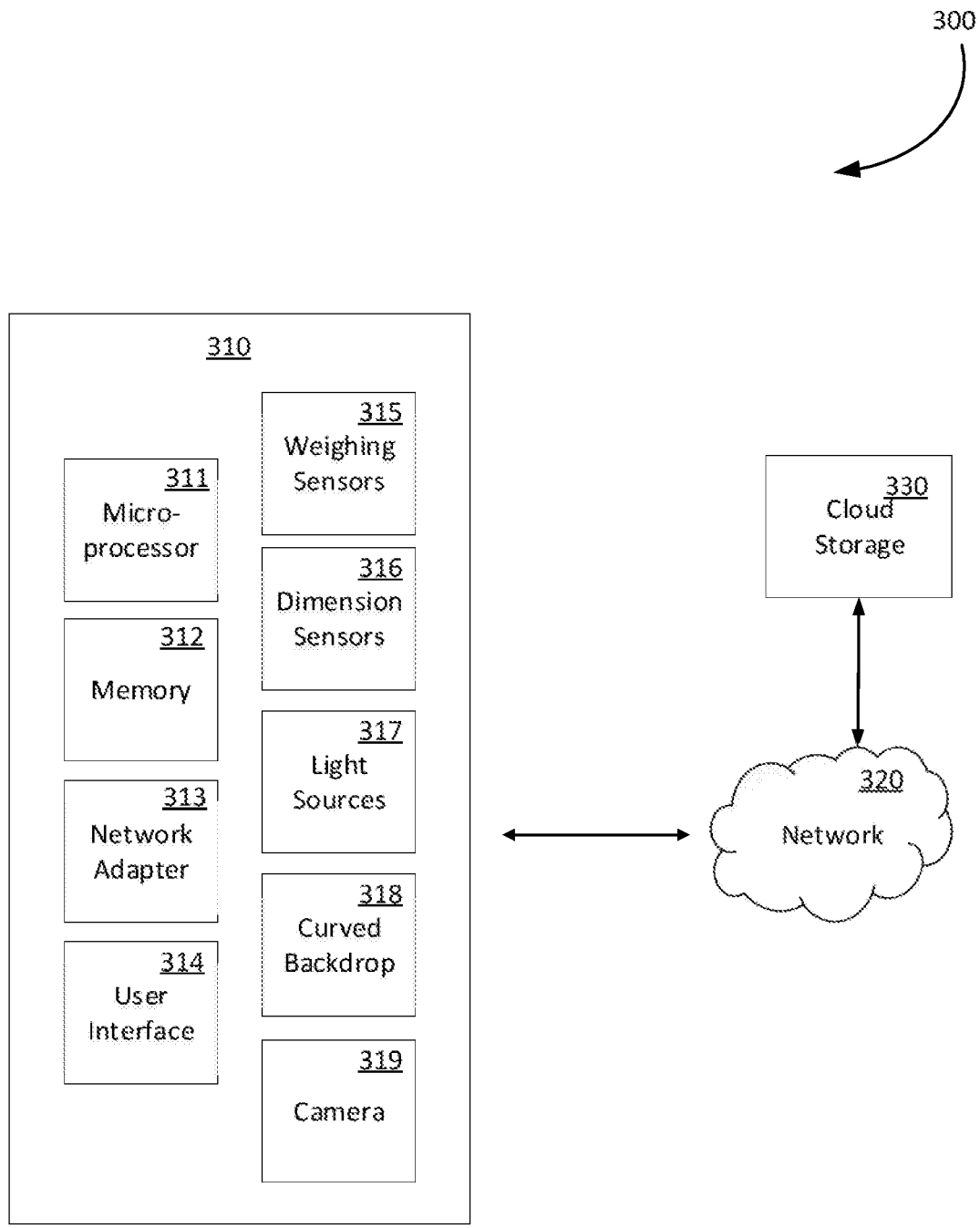
FIG. 3 is a functional block diagram of a general-purpose computing system on which the present embodiments may be implemented according to various aspects of the present disclosure.

FIG. 2 is a flowchart illustrating a process 200 for photographing, weighing, and dimensioning of an object. The process 200 can begin at step 210. At step 210, an object can be weighed using at least one sensor. The sensor can detect pressure and communicate the data to one or more microprocessors connected to the sensor. In one example, the weight sensors can include a transducer that detects a pressure signal and converts it into a data signal to be sent for processing. Step 210 can use more than one sensor, for example, with each sensor contributing to the overall pressure measurement. The object can be placed directly on the sensors or a surface can be placed between them. The surface can be a plastic sheet, for example, and can rest directly on the sensors. In scenarios like this, process 200 can include logic and functionality for zeroing out any pressure that is created by the weighing surface. In one embodiment, the surface can be suspended above the sensors when no object is upon it. The surface will, when an object is placed on it, initiate contact with the sensors and consequently engage the sensors in measurement. In some embodiments, the surface can rest against a framework or other structure located above the top of the sensors, thus preventing direct contact prior to an object's weight pushing the surface lower. In some embodiments, the surface can be inserted into a channel located above the top of the sensors, thus enabling a resting contactless relationship between the surface and the sensors, as well as providing a stable environment for the surface by limiting its movement when the object is placed, shifted, and removed from the surface. The surface can be permanent, semi-permanent, or easily removable and still be compatible with the design of being suspended above the sensors. The weighing can be achieved by a single sensor or by multiple sensors. The placement of the sensor(s) can be fixed onto the base of the photo booth or it can be adjustable based on, for example, the size and shape of the object to be placed on the surface. In one embodiment, four sensors can be used and placed in locations outside or within the diameter of the object, or both.

At step 220, the object can be framed by a curved backdrop. Photographing objects for accuracy requires, among other things, a background that does not interfere with the color or lines of the object. Unlike a rectangular or other angled background, the seamlessly curved backdrop 220 provides a smooth appearance in the final image and does not interfere with electronic recordation or manipulation of the image and measurements. The curved surface 220 can be achieved via a flexible sheet of material. The material can be primarily plastic in composition, for example, composed of polystyrene. Other materials can be included or relied upon in the composition, depending on the desired curvature, texture, and appearance of the image background. Providing the surface 220 can include providing a standard, pre-cut sheet to use as the backdrop. A standard sheet can be bent to fit into the channels of the base and pressed against the top of the frame, providing 220 the seamless, curved surface. The sheet can be permanently installed as part of the base. The sheet can also be semi-permanent via an attaching mechanism, such as screws, clamps, etc., to secure the sheet in place. The sheet surface can also be easily removed and secured in place via the fulcrum of the base channels and upper frame, as one example. Varying with the composition materials of the sheet surface, an easily removable setup may be desired, for example, if the sheet material is susceptible to scratching or other degradation.

The angle of curvature can be adjusted, for example, by adjusting the positions of the fulcrums, which consequently elongates or shortens the angle of curvature. The channels in the base also serve to flatten out the surface sheet away from the curvature. This can aid in reducing or removing additional flexing of the backdrop when an object is placed on it. When the object is placed on it, the sheet surface will depress relative to the channels and contact the weighing sensors located beneath the level of the channels, such that the suspended surface can now engage the weighing sensors. Integration of the weighing surface and backdrop simplifies construction and improves economy of components and cost. The angle of curvature is important in accurately framing 220 the object and minimizing effects of shadow. Configuring the slots or channels can include adjustable slots/channels that can tighten the fit of an inserted sheet for reduced movement. Method 200 can include providing machined channels in a base of extruded aluminum, as one example of material. For example, the base can be provided with left and right sides including channels, and the sheet can fit within these channels up to the end of the channels. The base can also include a securing bracket for the sheet. In addition to the fulcrums of the front bottom securing bracket (or channel end) and the front top securing bracket (or top of the booth), the shoulders of the side panels of the booth can support the rounded effect of the sheet. The brackets can be custom aluminum strips for the front top and front bottom and can be utilized to clamp the flexible panel into place at both ends. If there is wear or discoloration, the panel can be easily removed and replaced by simply loosening the front top and front bottom brackets.

At step 230, method 200 can illuminate the object with at least one artificial light source. The light source can originate from a single point of light or from patterns of light-emitting sources, such as a string of lights or an array of a multiplicity of lights, to illustrate examples. The lights can be coupled to the base in a fixed or flexible arrangement. Flexible arrangements can include strip lights and rigidly flexible snake lights that can hold a flexed position. The adjustability can include telescoping, tilting, goosenecking, and rotating, as well as adjustability for brightness and color. Some examples of LED color options can include contribution by red, blue, green, and white; and these degrees of each color can be automatically chosen and also adjusted by user input. Brightness can be adjusted by an amount of energy directed to each light source and by turning on or off individual light points within a given light source. The adjustability of illumination angle, brightness, and color can all be directed via a user interface communicably coupled to the light sources. The light sources can be hard-wired to the one or more microprocessors and can include BLUETOOTH® or other wireless technology for electronic communication. Each light source can be configured independently of the other light sources, both manually and via the microprocessors. The light sources and groups of light sources can be held in place by brackets, and can be programmatically angled toward the object, toward the backdrop, and for indirect illumination of the object.

The light sources can be powered by cables running from the base of the booth up through the gooseneck or telescoping components. The power cable can be run through the tube that supports the light module. Method 200 can also include configuring a gooseneck or telescoping component with a cavity for running an electrical or data wire. Additionally, method 200 can include configuring a bracket of nonconductive material for holding and guiding wires and cables between the light sources, microprocessors, and power sources. The nonconductive brackets can be adjustably mounted to the booth.

At step 240, method 200 can measure at least one dimension of the object. The sheet surface and photo booth usable area can be configured to provide the space for the dimensioning sensors. Configuring the booth in this way is efficient and deliberate to enable sensors to measure multiple dimensions without the object being moved. The angles and sight lines configured can enable a single sensor to measure more than one dimension. These angles and sight lines can also provide for multiple camera angles. Method 200 can use a top-down approach in determining length, width, and height of the object. Measuring can be achieved via fixed cameras and sensors and can include creating a point cloud in three dimensions. The camera and dimensioning assembly can be configured on the underside of the user interface display.

Dimensioning can be configured to focus on objects located in a substantially central portion of the sheet's flat surface. In some configurations, the camera module and dimensioning sensors can be part of a single assembly. The assembly can be coupled to the top of the booth frame with a downward perspective on the object and sheet surface. In some embodiments, the assembly can also include a user interface display. A dimensional scan can be initiated from a user or from an external signal. The camera can self-determine the proper focusing for the object and can capture one or more images when ready. This data, as well as point cloud data, can be analyzed to calculate the length, width, and height. Computer instructions can then be executed by the microprocessors to calculate the dimensions. In some embodiments, the software can determine the edges of the object by drawing a theoretical box around the image. The user interface can display the image, the top-down perspective, and the measurements. A user or artificial intelligence can make a determination about the accuracy of the measurements based on, for example, if the bounding box does not contain the entire object. The dimensioning process can be repeated until a satisfactory result is achieved. The data, images, and calculations can be stored locally as well as communicated to a remote memory location.

Method 200 can also include configuring the booth with at least one power supply. The power supplies can be configured around the outside frame of the photo booth, maximizing the space available for the surface sheet, objects, and lighting. Similarly, computer processing components can be mounted with deference to the central photographing and dimensioning space. In addition to providing efficient space for framing an object, configuring power sources and computer components around the periphery of the booth can increase the heat-dissipation capacity. For example, method 200 can utilize the ground plane to dissipate heat from the power sources, light sources, and processor components. Method 200 can also include configuring heat sinks in optimized positions within the photo booth, in order to maximize the overall heat-dissipating capacity. Similarly, wire connectors can be configured toward the rear of the booth to reduce wire build up and to aid in reducing heat.

The operations described and shown in method 200 of FIG. 2 can be carried out or performed in any suitable order as desired in various embodiments of the disclosure, and method 200 can repeat any number of times. For example, in some embodiments, weighing 210 can occur after framing 220, or after illuminating 230, or after all the other steps. Additionally, in certain embodiments, at least a portion of the operations can be carried out in parallel. Furthermore, in certain embodiments, fewer or more operations than described in FIG. 2 can be performed.

Method 200 can optionally end after block 260.

According to another embodiment of the disclosure, there is provided a system 300 for photographic dimensioning of an object. System 300 can include a photo booth 310 for framing the object and housing components. Booth 310 can include at least one microprocessor 311. The microprocessors 311 can access the memories 312 which, among other things, store computer-executable instructions to perform tasks requiring logic, calculations, storage, and/or retrieval. Memory 312 can include multiple storage devices and can store computer instructions for operating and managing photo booth 310 data and information. Memory 312 can also work in conjunction with cloud storage 330 via network adapter 313 and network 320. The exchange of logic, data, and information between memory 312 and remote storage 330 can be via immediate, delayed, and scheduled transactions. In some embodiments, scheduled transactions can include transferring saved images and data from booth 310 to a centralized or distributed storage 330; and can also include updating software logic to booth 310 on periodic bases.

Processor 311 can implement directions provided to booth 310 via user interface 314. In some embodiments, a user can specify a desired angle and brightness of illumination for the object to be photographed, and microprocessor 311 can direct booth 310, based on that information, and accordingly adjust the light sources 317. Via interface 314, a user can also specify when an object is to be weighed, and when and how an object is to be dimensioned, and microprocessor 311 can operate and manage the appropriate light sources 317, weighing sensors 315, and dimensioning sensors 316 accordingly. In some embodiments, user interface 314 is not required to engage photo booth 310 or its components. An object placed on the flat surface of the curved backdrop 318 can trigger the weighing sensors 315 which can consequently initiate the object-measuring and -recording process. In some embodiments, this automatic initiation can be triggered by camera 319 or dimension sensors 316.

Camera 319 can record both still and video images of objects placed on the flat surface of curved backdrop 318. The images can be stored locally on memory 312 and can also be transferred to cloud storage 330. Memory 312 can include removable storage such as USB drives and flash cards. Microprocessor 311 can compare predetermined images of objects stored in memory 312 or storage 330 and determine similarities, if any, between the stored images and data with the current object. Depending on the comparison, microprocessor 311 can prepopulate values for dimension and weight to apply to the current object. These prepopulated values can be accepted as appropriate for the current object without further measurement, or microprocessor 311 can consider them while engaging light sources 317, weighing sensors 315, dimensioning sensors 316, and camera 319 to measure new values.

Both via user interface 314 and automatically, microprocessor 311 can engage weighing sensors 315 to determine the pressure exerted by an object on the weighing surface. User interface 314 can include conventional methods of user input, such as a touch screen. The weighing sensors 315 can include one or more scales, for example transducers, that detect the presence of an object and outputs corresponding data to processor 311. The weighing surface can be part of the same sheet of material that forms the curved backdrop 318. Similar to the weighing sensors 315 are the dimensioning sensors 316, light sources 317, and camera 219 which can also be engaged by microprocessor 311.

Network 320 can include any conventional methods of computer communication over LAN, WAN (such as the internet), or between devices (such as BLUETOOTH®). The communication can be between photo booth 310 and remote storage 330, and can also be between and among components of booth 310. In some embodiments of system 300, components need not be hard-wired to be communicably coupled to each other. For example, interface 314 can be connected via BLUETOOTH® to processor 311 and sensors 315, 316. Some components can include inherent wireless communication capability, and other components can include wired communication capability, such that all components can be controlled or communicated with via wireless network adapters, either directly or indirectly.

The memory 312 may store instructions for communicating with other systems, such as a computer. The memory 312 may store, for example, a program (e.g., computer program code) adapted to direct the processor 311 in accordance with the present embodiments. The instructions also may include program elements, such as an operating system. While execution of sequences of instructions in the program causes the processor 311 to perform the process steps described herein, hard-wired circuitry may be used in place of, or in combination with, software/firmware instructions for implementation of the processes of the present embodiments. Thus, the present embodiments are not limited to any specific combination of hardware and software.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented and may be performed in any order. Further, steps that have been presented as being performed separately may in alternative embodiments be performed concurrently. Likewise, steps that have been presented as being performed concurrently may in alternative embodiments be performed separately.

Now that these embodiments have been described,

What is claimed is:

1. A photographic dimensioning device for capturing information about an object, the device comprising:
   a base coupled to at least two weight sensors operable to measure weight of the object, the weight sensors electrically communicably coupled to at least one microprocessor;
   a curved backdrop, at least a portion of which is fit into a slot in the base;
   at least one light source to illuminate the object, the at least one light source coupled to the base and communicably coupled to the at least one microprocessor;
   at least one camera to record an image of the object, the at least one camera communicably coupled to the at least one microprocessor;
   at least one sensor to detect at least one dimension of the object, the at least one sensor communicably coupled to the at least one microprocessor; and
   a plate in contact with the curved backdrop and the weight sensors when the object is placed on the curved backdrop.

2. The device as described in claim 1, wherein the at least one light source is configurable for an angle of illumination.

3. The device as described in claim 1, wherein the at least one light source is configurable for brightness.

4. The device as described in claim 1, wherein the at least one sensor returns point cloud data.

5. The device as described in claim 1, wherein the at least one sensor is operable to determine multiple dimensions of the object without moving the object.

6. The device as described in claim 1, further comprising a user interface coupled to the at least one microprocessor and configured to electronically control the at least one light source and the at least one camera.

7. A method for photographically dimensioning an object, the method comprising:
   framing the object in a seamless curved background, where at least a portion of the seamless curved background is fit into a slot in a base, and a plate contacts the seamless curved background and a plurality of scales on the base when the object is placed on the seamless curved background;
   weighing the object on the plurality of scales;
   illuminating the object with at least one light source;
   measuring at least one dimension of the object;
   recording an image of the object; and
   managing operation of the method via at least one microprocessor.

8. The method of claim 7, further comprising configuring the at least one light source with an adjustable angle of illumination.

9. The method of claim 7, further comprising configuring the at least one light source with an adjustable brightness.

10. The method of claim 7, wherein the measuring is based at least in part on point cloud data.

11. The method of claim 7, wherein the measuring comprises multiple dimensions with a stationary object.

12. The method of claim 7, further comprising controlling the illuminating and the recording via a user interface.

13. A photographic dimensioning system comprising:
   at least one microprocessor; and
   at least one memory storing computer-readable instructions wherein the at least one microprocessor is operable to access the at least one memory and execute the computer-readable instructions to:
      display an object against a seamless curved backdrop, where at least a portion of the seamless curved background is fit into a slot in a base, and a plate contacts the seamless curved background and at least one weigh transducer on the base when the object is placed on the seamless curved background;
      control at least one light source to illuminate the object;
      weigh the object via at the least one weight transducer;
      measure at least one dimension of the object; and
      record an image of the object.

14. The system of claim 13, wherein the computer-readable instructions are further operable to adjust an angle of illumination of the at least one light source.

15. The system of claim 13, wherein the computer-readable instructions are further operable to adjust a brightness of the at least one light source.

16. The system of claim 13, wherein the computer-readable instructions are further operable to evaluate point cloud data to measure the at least one dimension.

17. The system of claim 13, wherein the computer-readable instructions are further operable to measure multiple dimensions of the object without moving the object.

18. The system of claim 13, wherein the computer-readable instructions are further operable to manage photographic dimensioning based on user input.

19. The system of claim 13, wherein the computer-readable instructions are further operable to record data in cloud-based memory.

20. The system of claim 13, wherein the computer-readable instructions are further operable to retrieve cloud-point data from an internet-based storage.

21. The method of claim 7, wherein the weighing is achieved via a weighing surface suspended above weighing sensors.

22. The method of claim 7, wherein the framing comprises a single sheet of primarily plastic material.

23. The device of claim 1, wherein the curved backdrop comprises a single sheet of primarily plastic material.

24. The system of claim 13, wherein the seamless curved backdrop comprises a single sheet of primarily plastic material.

* * * * *